United States Patent
Hamilton, II et al.

(10) Patent No.: US 7,325,062 B2
(45) Date of Patent: Jan. 29, 2008

(54) METHOD AND SYSTEM FOR AUTOMATED ADAPTER REALLOCATION AND OPTIMIZATION BETWEEN LOGICAL PARTITIONS

(75) Inventors: Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 10/427,105

(22) Filed: Apr. 30, 2003

(65) Prior Publication Data

US 2004/0221039 A1 Nov. 4, 2004

(51) Int. Cl.
*G06F 15/173* (2006.01)
(52) U.S. Cl. ............... 709/226; 709/223; 709/224; 709/238; 709/239
(58) Field of Classification Search ........... 709/104, 709/215; 718/102, 104; 711/114, 173
See application file for complete search history.

(56) References Cited

U.S. PATENT DOCUMENTS

| 4,603,382 | A | 7/1986 | Cole et al. ............... 364/200 |
|---|---|---|---|
| 5,504,670 | A | 4/1996 | Barth et al. ............. 364/134 |
| 5,875,464 | A | 2/1999 | Kirk ........................ 711/129 |
| 5,889,989 | A | 3/1999 | Robertazzi et al. ..... 395/675 |
| 5,978,583 | A | 11/1999 | Ekanadham et al. ..... 395/703 |
| 6,199,075 | B1 | 3/2001 | Ungar et al. ............ 707/206 |
| 6,321,373 | B1 * | 11/2001 | Ekanadham et al. ..... 718/102 |
| 6,327,587 | B1 | 12/2001 | Forster ....................... 707/2 |
| 6,366,945 | B1 * | 4/2002 | Fong et al. .............. 718/104 |
| 6,378,039 | B1 | 4/2002 | Obara et al. ............ 711/114 |
| 6,968,441 | B1 * | 11/2005 | Schnee ..................... 711/173 |
| 2002/0112102 | A1 * | 8/2002 | Tarui et al. ............. 709/215 |
| 2002/0178337 | A1 | 11/2002 | Wilson et al. ........... 711/173 |
| 2003/0005215 | A1 | 1/2003 | Arimilli et al. .......... 711/105 |
| 2003/0037092 | A1 * | 2/2003 | McCarthy et al. ....... 709/104 |
| 2003/0177310 | A1 * | 9/2003 | Katsuragi et al. ........ 711/114 |

* cited by examiner

*Primary Examiner*—Quang N. Nguyen
(74) *Attorney, Agent, or Firm*—David A. Mims, Jr.; Rudolf O. Siegesmund; Gordon & Rees, LLP (57) ABSTRACT

A method and system for reallocating adapters in a logically partitioned environment. The present invention comprises a Performance Enhancement Program (PEP) and a Reallocation Program (RP). The PEP allows an administrator to designate several parameters and identify donor and recipient candidates. The RP compiles the performance data for the adapters and calculates a composite parameter. For each adapter in the donor candidate pool, the RP compares the composite parameter to the donor load threshold to determine if the adapter is a donor. For each adapter in the recipient candidate pool, the RP compares the composite parameter to the recipient load threshold to determine if the adapter is a recipient. The RP then allocates the adapters from the donors to the recipients. The RP continues to monitor and update the workload statistics based on either a moving window or a discrete window sampling system.

26 Claims, 4 Drawing Sheets

METHOD AND SYSTEM FOR AUTOMATED ADAPTER REALLOCATION AND OPTIMIZATION BETWEEN LOGICAL PARTITIONS

FIELD OF THE INVENTION

The present invention is related generally to method for increasing computer system efficiency and specifically to a computer program for reallocating adapters amongst virtual systems.

BACKGROUND OF THE INVENTION

A computer system is a collection of computer components, such as adapters, which work together to perform a specific task, and is well known in the art. The computer systems may be located in a single computer, such as a server, or in a plurality of computers, such as computer network. System administrators (hereinafter, administrators) are people who setup and manage computer systems. One of the tools used by administrators to increase the performance of a computer system is physical partitioning. Administrators physically partition a managed system by dedicating buses and predefined physical modules within the system to assist in creating the smaller partitioned systems, referred to as virtual systems. Each virtual system in a managed system appears to the end user as a completely separate system. In addition, virtual systems improve administrative flexibility and application performance.

Another method used by administrators to increase system performance is logical partitioning. Logical partitioning is a process which creates logical partitions within the managed system. Logical partitioning is distinct from physical partitioning in that there are no physically separated buses, memory, or adapters in a logically partitioned system. Instead, the virtual systems are separated only by the system software. Similar to the physically partitioned system, each individual virtual system created by logical partitioning appears to the end user as a completely separate system. One advantage of logical partitioning is that logical partitioning permits much finer granularity in virtual system creation, such that any processor, memory, or adapter may be easily added or removed from a virtual system. Logical partitioning is generally controlled by a hardware management console outside of the managed system. The hardware management console controls the division of the managed system into the virtual systems and, if necessary, the reallocation of resources amongst the various virtual systems.

Recently, administrators have been able to move system hardware resources within the managed system with increased flexibility. When the reallocation occurs without having to reboot the managed system, the logical partitioning is known as dynamic logical partitioning. The prior art methods of dynamic reallocation require the system administrator to recognize the need for reallocation, and then manually reallocate the resources. For example, in a system comprising a first logical partition having two fibre channel storage adapters and a second logical partition having two fibre channel storage adapters, the system administrator may observe that during a peak processing period, the first logical partition is experiencing a heavy wait time and the second logical partition is not. Upon observing the disparity in wait time, the administrator may manually move one or more adapters from the second logical partition to the first logical partition to improve system performance during the peak processing period. Therefore, a need exists for a system and method to automate the control and movement of resources in a dynamic logical partitioning environment.

The need for automation within the reallocation process has been addressed by the prior art. U.S. Pat. No. 4,603,382 (the '382 patent) entitled "Dynamic Buffer Reallocation" discloses a method for dynamically reallocating data storage segments within a storage device. The '382 patent monitors the properties of the data storage device and reallocates the buffer segments when they exceed a predefined threshold. U.S. Pat. No. 5,875,464 (the '464 patent) entitled "Computer System with Private and Shared Partitions in Cache" discloses a partitioned cache memory buffer which monitors the allocation of tasks. The memory buffer of the '464 patent reallocates the tasks when necessary. U.S. Pat. No. 5,978,583 (the '583 patent) discloses a method of reallocating applications during the course of their execution. The method disclosed in the '583 patent monitors the applications and redistributes the applications when necessary based on various criteria. U.S. Pat. No. 6,366,945 (the '945 patent) entitled "Flexible Dynamic Partitioning of Resources in a Cluster Computing Environment" discloses a method for dynamic partitioning of a computer network. The method of the '945 patent monitors the resources within the virtual networks and moves resources among networks when required. However, the '945 patent is limited in that it does not disclose a method for dynamic logical partitioning of a managed network. Consequently, what is needed beyond the '382, '464, '583, and '945 patents is a method and system for dynamic logical partitioning of a managed system. Furthermore, a need exists for a method and system for reallocating resources among the computers within a virtual system.

SUMMARY OF THE INVENTION

The present invention, which meets the needs stated above, is a method and system for reallocating adapters in a logically partitioned environment. The software embodiment of the present invention comprises a Performance Enhancement Program (PEP) and a Reallocation Program (RP). The PEP allows an administrator to designate a performance parameter, a capture interval, a sampling interval, a donor candidate pool, a recipient candidate pool, a donor load threshold and a recipient load threshold. The RP compiles the performance data for the adapters and calculates a composite parameter. For each adapter in the donor candidate pool, the RP compares the composite parameter to the donor load threshold to determine if the adapter is a donor. For each adapter in the recipient candidate pool, the RP compares the composite parameter to the recipient load threshold to determine if the adapter is a recipient. RP then determines if adapter reallocation is necessary. If reallocation is necessary, the RP allocates the adapters from the donors to the recipients. The RP continues to monitor and update the workload statistics based on either a moving window or a discrete window sampling system. The partitioned system of the present invention does not require a reboot to reallocate adapters.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein the term "computer" shall mean a machine having a adapter, a memory, and an operating system, capable of interaction with a user or other computer, and shall include without limitation desktop computers, notebook computers, personal digital assistants (PDAs), servers, handheld computers, and similar devices.

As used herein, the term "managed system" means a collection of hardware components, such as adapters, which work together to accomplish a specific task. The hardware components may be located in a single computer or in a plurality of networked computers.

As used herein, the term "adapter" means the input/output adapters of a virtual system. Examples of adapters include gigabit ethernet, 10/100 ethernet, fibre channel, ATM, and FDDI. Similar types of adapters may be grouped together in subclass collectives.

As used herein, the term "performance parameter" means one or more parameters used to measure the workload on an adapter. Performance parameters include wait I/O, netstat, entstat, and adapter failure. Other performance parameters are known by persons skilled in the art. Performance parameters may also include a combination of several individual performance parameters. Specific performance parameters may also be specified for a whole class of adapters (i.e. all I/O adapters), or the performance parameters may be defined for each individual subclass of adapters (i.e. fibre channel storage adapters).

As used herein, the term "wait I/O" or "I/O wait" means the condition within a system where a given input/output device is completely saturated with workload, and as such, any new I/O requests are place in a cached/memory wait queue until such time that the I/O subsystem is able to complete processing of current requests and respond to the new requests.

As used herein, the term "netstat" means a UNIX utility used to monitor I/O on network adapters or subsystems.

As used herein, the term "enstat" means a UNIX utility used to monitor I/O on, specifically, class 802 ethernet network adapters or subsystems. Persons skilled in the art are aware of other specific monitors, similar to enstat, which exist for the wide range of I/O adapters available in computer systems.

As used herein, the term "adapter failure" means the inability of an adapter to perform its intended task. Adapter failure can be implicitly reflected in the performance parameter: if a fibre channel adapter fails, then the wait I/O time increases on the failed adapter, any associated adapters, and/or any load-balanced adapters in the system. Adapter failure may also be explicitly reflected in the performance parameter: when the fibre channel is working, no action is necessary, but when the fibre channel is not working, action is necessary.

As used herein, the term "adapter subclass" means a specific type of adapter under consideration. Examples of adapter subclasses include: gigabit ethernet, 10/100 ethernet, fibre channel, ATM, and FDDI. Persons skilled in the art are aware of other adapter subclasses.

As used herein, the term "subclass collective" means the collection of all adapters of the same subclass within a managed system.

As used herein, the term "donor candidate" means a system which is designated by a user as eligible to donate an adapter to another system. The group of all donor candidates is referred to as the donor candidate pool. A donor candidate will become a donor if the system's composite parameter is less than the donor load threshold.

As used herein, the term "donor" means a system which has a composite parameter less than the donor load threshold. The group of all donors is referred to as a donor pool.

As used herein, the term "recipient candidate" means a system which is designated by a user as eligible to receive an adapter from another system. The group of all recipient candidates is referred to as the recipient candidate pool. A recipient candidate will become a recipient if the system's composite parameter is greater than the recipient load threshold.

As used herein, the term "recipient" means a system which has a composite parameter greater than the recipient load threshold. The group of all recipients is referred to as a recipient pool.

As used herein, the term "donor load threshold" means a specific performance parameter level below which a donor may provide an adapter to a recipient.

As used herein, the term "recipient load threshold" means a specific performance parameter level above which a recipient may receive an adapter from a donor.

As used herein, the term "conditioning interval" means the period during which no adapter reallocation will transpire. Sampling statistics may or may not be collected during this period, but no action will be taken upon these statistics until completion of the conditioning interval.

As used herein, the term "capture interval" means the interval at which statistics are collected on adapter performance for various systems. The capture interval is any interval shorter than or equal to the sampling interval.

As used herein, the term "sampling interval" means the window of time over which sample statistics are captured. The sampling interval is equal to or greater than the capture interval. For example, statistics might be captured every five seconds for a five minute sampling interval. In that case, sixty statistical samples would be available at the end of the sampling interval. The sampling interval can be implemented as either a moving window or a discrete window.

As used herein, the term "moving window" means that, for each new performance parameter value which is added to the collection of samples, the oldest performance parameter value, formerly within the sampling interval, falls out of consideration. The advantage of using a moving window, vis-à-vis a discrete window, is that the moving window provides greater responsiveness in providing adapter resources when and where they are needed. The use of a moving window normally requires computation of the composite parameter once for each sample taken.

As used herein, the term "discrete window" means that the sampling window is reset on a regular basis and those samples are considered in individual, non-overlapping time periods. The advantage of using a discrete window, vis-à-vis a moving window, is that the discrete window requires fewer processing resources because the composite parameter is only calculated once per sampling interval.

As used herein, the term "composite parameter" means the average of the adapter data accumulated over the sampling interval. The average used to calculate the composite parameter may be the mean, median, mode, or norm. Smoothing criteria may optionally be used to determine the composite parameter. An example of smoothing would be removing the high and low values of the data collected during the sampling interval.

As used herein, the term "controlling entity" means the computational device, either internal or external to the managed system, which manages the reallocation of adapters. In a UNIX environment, this is known as the Hardware Management Console.

Figure 1:
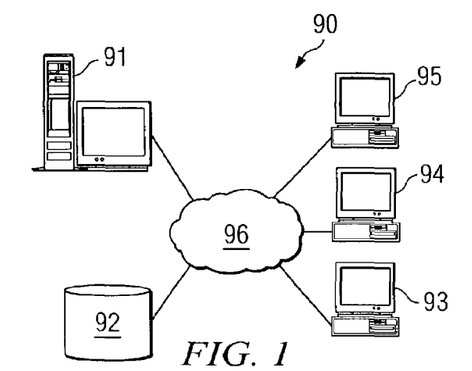
FIG. 1 is an illustration of a computer network used to implement the present invention.

FIG. 1 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network that may contain the present invention and is not meant as an architectural limitation.

Figure 2:
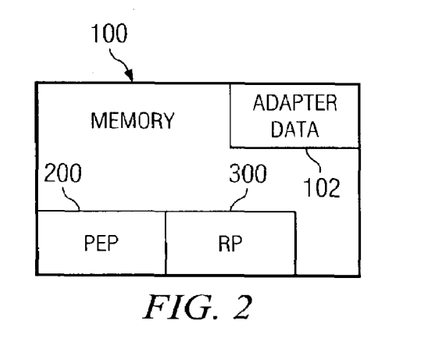
FIG. 2 is an illustration of the memory used to implement the present invention.

The internal configuration of a computer, including connection and orientation of the adapter, memory, and input/output devices, is well known in the art. The present invention is a methodology that can be embodied in a computer program. Referring to FIG. 2, the methodology of the present invention is implemented on software by Performance Enhancement Program (PEP) 200. PEP 200 includes Reallocation Program (RP) 300. PEP 200 and RP 300 described herein can be stored within the memory of any computer depicted in FIG. 1. Alternatively, PEP 200 and RP 300 can be stored in an external storage device such as a removable disk or a CD-ROM. Memory 100 is illustrative of the memory within one of the computers of FIG. 1. Memory 100 also contains adapter data 102. The present invention may interface with adapter data 102 through memory 100. As part of the present invention, the memory 100 can be configured with PEP 200 and/or RP 300.

In alternative embodiments, PEP 200 and/or RP 300 can be stored in the memory of other computers. Storing PEP 200 and/or RP 300 in the memory of other computers allows the processor workload to be distributed across a plurality of processors instead of a single processor. Further configurations of PEP 200 and/or RP 300 across various memories are known by persons skilled in the art.

Figure 3:
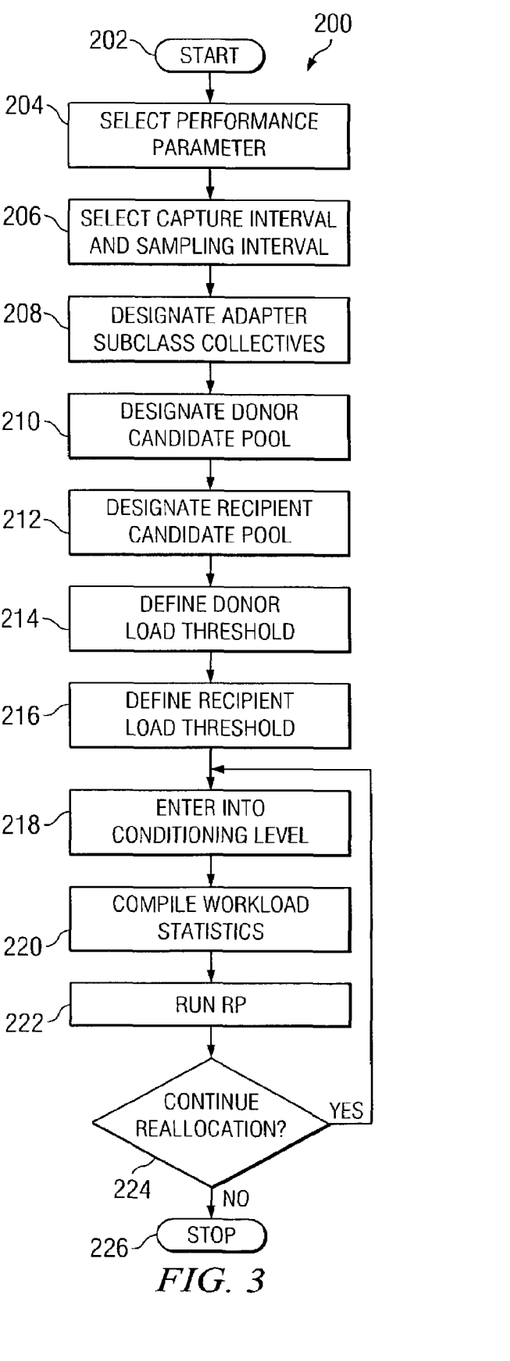
FIG. 3 is an illustration of the Performance Enhancement Program (PEP) of the present invention.

Turning to FIG. 3, a flowchart of the logic of PEP 200 is illustrated. PEP 200 is a program which allows the user to designate performance enhancement criteria. The user described herein may be, for example, a system administrator. PEP 200 starts (202) and the user selects at least one performance parameter (204). The performance parameter is used by RP 300 to measure the workload on the adapters. The user may select a performance parameter for all adapters or may select a performance parameter for each adapter subclass. The user then defines the capture interval and the sampling interval (206). The capture interval and the sampling interval are used by RP 300 to develop adapter data for adapter reallocation. The user then designates the adapter subclass collectives (208). Alternatively, PEP 200 can determine the adapter subclass collectives from the adapter data 102.

The user then designates the donor candidate pool within each subclass collective (210). In designating the donor candidate pool, the user selects the adapters which are eligible to be donors. Donor candidates are generally computers or systems whose performance is of relatively low importance when compared to other computers or systems. Donor candidates may be either test or development computers or systems, or they could be applications of secondary criticality when compared with the criticality of the recipient candidates. Generally, all of the adapters would be selected as potential donors unless the user wants to specifically exclude certain adapters. The user then designates the recipient candidate pool within each subclass collective (212). In designating the recipient candidate pool, the user selects the adapters which are eligible to be recipients. Recipient candidates are computers or systems with relatively high priority or importance. Generally, all of the adapters would be selected as potential recipients unless the user wants to specifically exclude certain adapters.

The user then defines the donor load threshold within each subclass collective (214). The donor load threshold is used by RP 300 to determine when a donor candidate becomes a donor. A heavily loaded donor will not donate adapters unless its threshold value is set very high. The load threshold increases as system performance goes down, so that only a donor with a low load (i.e. relatively strong performance) may donate adapters. The threshold may be set to provide whatever degree of flexibility is desired by the user. For example, if the performance parameter is the wait I/O, the performance parameter limit might be set at a workload which yields a wait I/O of less than twenty percent. Thus, when an adapter has a workload which yields a wait I/O of less than twenty percent, the adapter will be identified as a potential donor.

The user-then defines the recipient load threshold within each subclass collective (216). The recipient load threshold is used by RP 300 to determine when a recipient candidate becomes a recipient. A lightly loaded recipient will not receive adapters unless its threshold value is set very low. As the load on the recipient system increases, the performance of the recipient system goes down, thus making the slow-running recipient candidate ripe for an adapter addition. For example, if the performance parameter is the wait I/O, the performance parameter limit might be set at a workload which yields a wait I/O of more than fifty percent. Thus, when an adapter has a workload which yields a wait I/O of more than fifty percent, the adapter will be identified as a potential recipient.

PEP 200 then enters into a conditioning level (218). The conditioning level may be system-wide or may be limited to a specific subclass of adapters. During the conditioning level, the adapter reallocation is temporarily suspended between the donors and the recipients. During the conditional period, PEP 200 optionally compiles the workload statistics for the adapters in the donor pool and in the recipient pool (220). If the workload statistics are compiled, then there may be some overlap between the data in the workload statistics and the data in the sampling interval. PEP 200 then runs RP 300 (222). PEP 200 then makes a determination whether to continue the adapter reallocation (224). If the user wants to continue adapter reallocation, PEP 200 returns to step 218. If the user does not want to continue adapter reallocation, PEP 200 ends (226).

Figure 4:
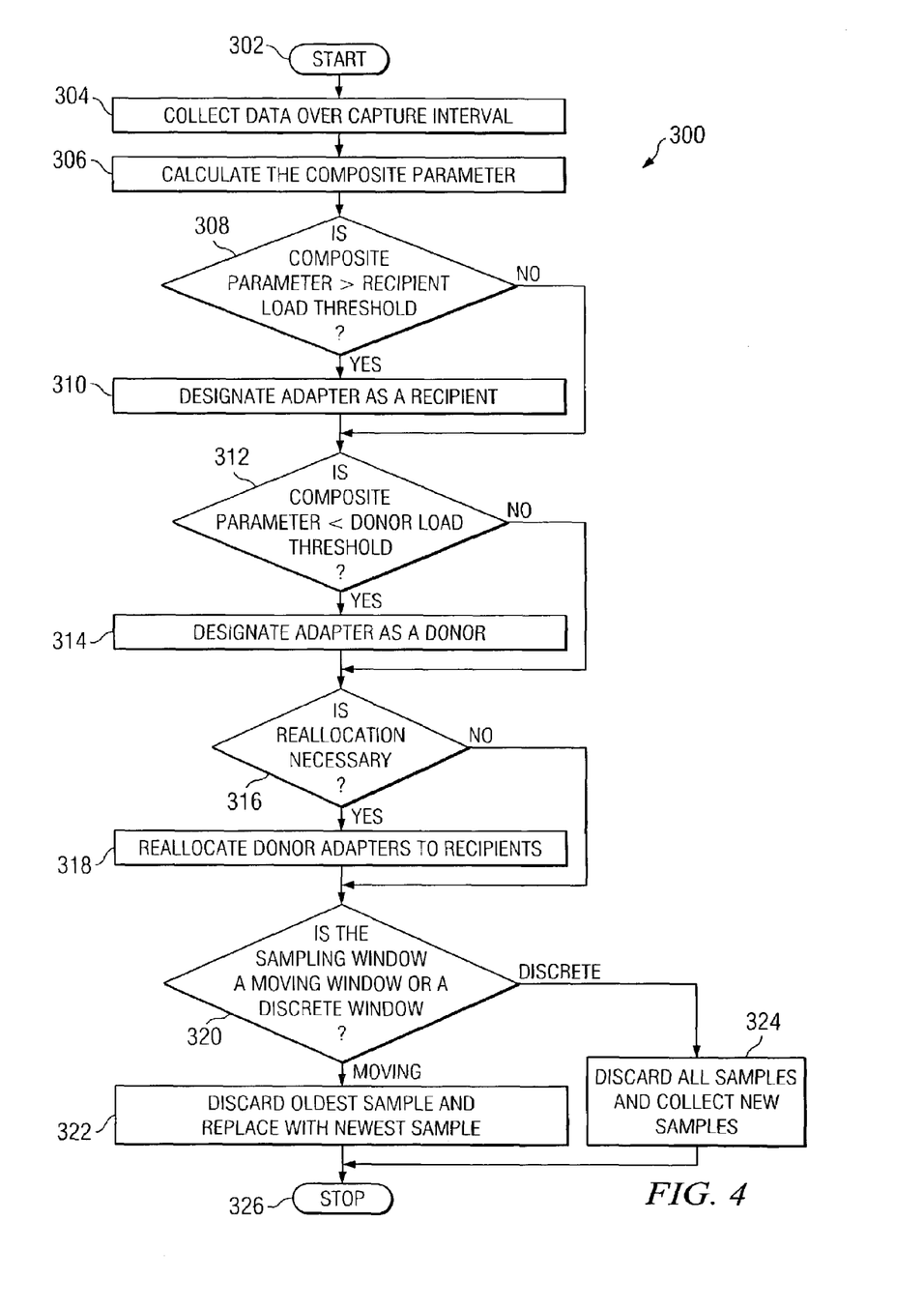
FIG. 4 is an illustration of the Reallocation Program (RP) of the present invention.

Turning to FIG. 4, a flowchart of the logic of RP 300 is illustrated. RP 300 is a program which reallocates the adapters. RP 300 starts (302) when prompted by PEP 200. RP 300 collects samples of the adapter data at the capture intervals over the sampling interval (304), saving the adapter data to a cache memory or hard disk. For example, if the performance parameter is the wait I/O, the capture interval is five seconds, and the sampling interval is five minutes, then RP 300 records the wait I/O percentage for each adapter at the end of every fifth second for a total of five minutes. After the sampling interval has elapsed, RP 300 then calculates the composite parameter (306). RP 300 calculates the composite parameter by averaging the adapter data.

RP 300 then analyzes the recipient candidates and makes a determination whether the composite parameter is greater than the recipient load threshold (308). If the composite parameter is not greater than the recipient load threshold, then RP 300 proceeds to step 312. If the composite parameter is greater than the recipient load threshold, then RP 300 designates that adapter as a recipient of an adapter of the same subclass (310) and proceeds to step 312. RP 300 then analyzes the donor candidates and makes a determination whether the composite parameter is less than the donor load threshold (312). If the composite parameter is not less than the donor load threshold, then RP 300 proceeds to step 316. If the composite parameter is less than the donor load threshold, then RP 300 designates that adapter as a donor of an adapter of the same subclass (314) and proceeds to step 316. RP 300 then makes a determination whether adapter reallocation is necessary (316). RP 300 can optionally send the composite parameter to the controlling entity for the determination whether reallocation is necessary. Reallocation will be necessary if there is at least one donor and at least one recipient. If reallocation is not necessary, RP 300 proceeds to step 320. If reallocation is necessary, RP 300 reallocates the donor adapters to the recipient adapters according to a method designated by those skilled in the art (318). Persons skilled in the art are aware of numerous methods for allocating donor adapters among recipient adapters. When the adapters are reallocated, tasks or applications queued for the recipient adapter(s) will be moved to the donor adapter(s). Persons skilled in the art are aware of how to move tasks or applications from one adapter to another. RP 300 then proceeds to step 320.

At step 320, RP 300 then makes a determination whether the sampling window is a moving window or a discrete window (320). If the sampling window is a moving window, RP 300 discards the oldest data sample and replaces the oldest data sample with the newest data sample (322). RP 300 then ends (326). If at step 320 the sampling window is a discrete window, RP 300 discards all of the data samples and collects new data samples (324). RP 300 then ends (326).

Figure 5:
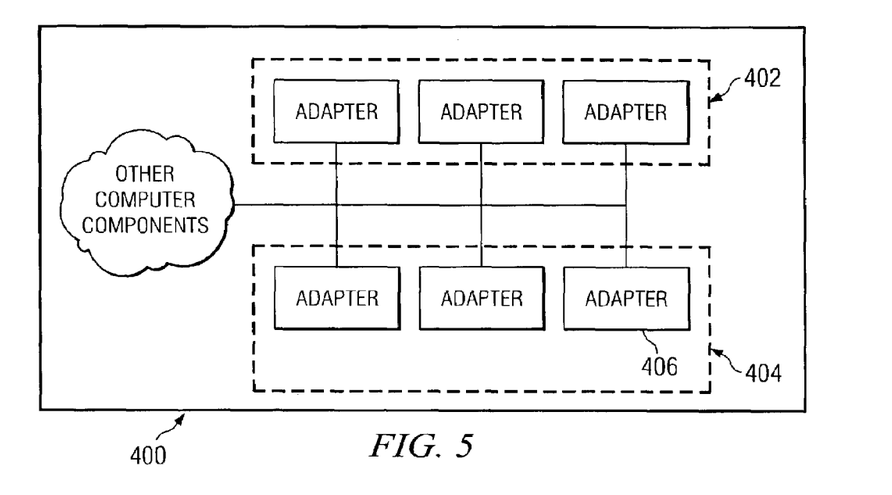
FIG. 5 is an illustration of a logically partitioned system in a single computer before application of the present invention.

PEP 200 and/or RP 300 may be implemented on a managed system which is a single computer, such as a server with a plurality of adapters. Turning to FIG. 5, server 400 comprises six adapters electrically coupled to other computer components. Persons skilled in the art are aware of the composition of other computer components which may be, for example, processor(s), random access memory (RAM), read only memory (ROM), devices, device controllers, hard disk drives, floppy disk drives, CD-ROM drives, DVD drives, system connections, system controllers, monitors, user input devices, and the like.

The adapters of server 400 are divided by logical partitioning into first virtual system 402 and second virtual system 404. If at least one of the adapters of first virtual system 402 exceeds the recipient load threshold and at least one of the adapters of second virtual system 404 is below the donor load threshold, then second virtual system 404 will be eligible to donate an adapter to first virtual system 402. By moving an adapter such as adapter 406 to first virtual system 402, adapter 406 can be donated to first virtual system 402.

Figure 6:
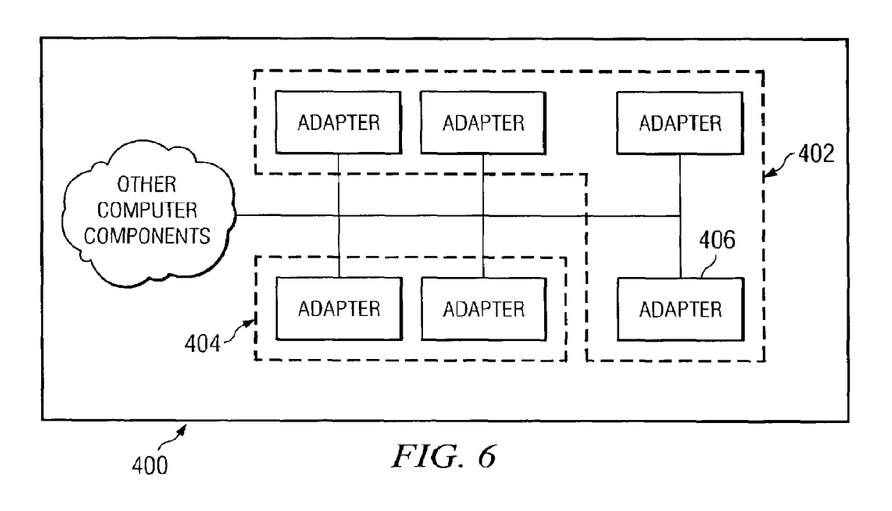
FIG. 6 is an illustration of a logically partitioned system in a single computer after application of the present invention.

Turning to FIG. 6, server 400 has been altered from the illustration in FIG. 5. In FIG. 6, adapter 406 has been moved from second virtual system 404 to first virtual system 402 by PEP 200 of the present invention.

Figure 7:
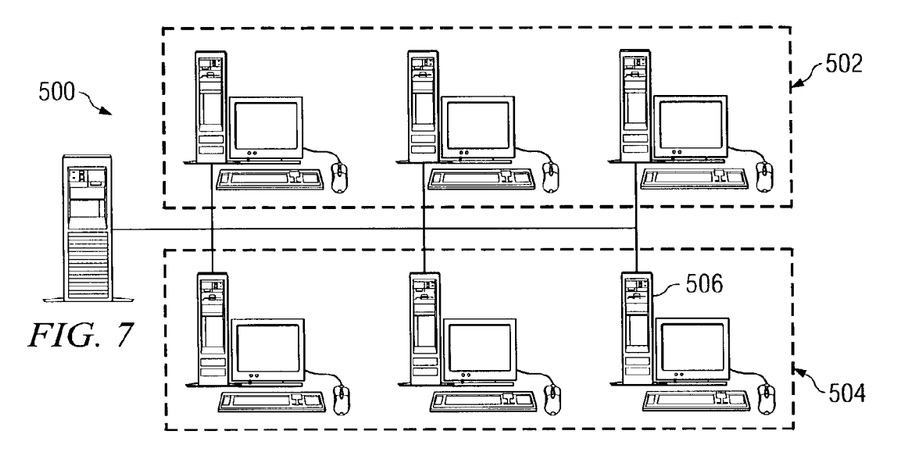
FIG. 7 is an illustration of a logically partitioned virtual system before application of the present invention.

The present invention is not limited in application to computer systems. PEP 200 and/or RP 300 may be implemented on a managed system which is a network of individual computers. Turning to FIG. 7, managed network 500 is divided by logical partitioning into first virtual network 502 and second virtual network 504. If at least one of the computers of first virtual network 502 exceeds the recipient load threshold and at least one of the computers of second virtual network 504 is below the donor load threshold, then second virtual network 504 will be eligible to donate a computer, and therefore an adapter, to first virtual network 502. By moving a computer such as computer 506 to first virtual network 502, the adapter of computer 506 can be donated to first virtual network 502.

Figure 8:
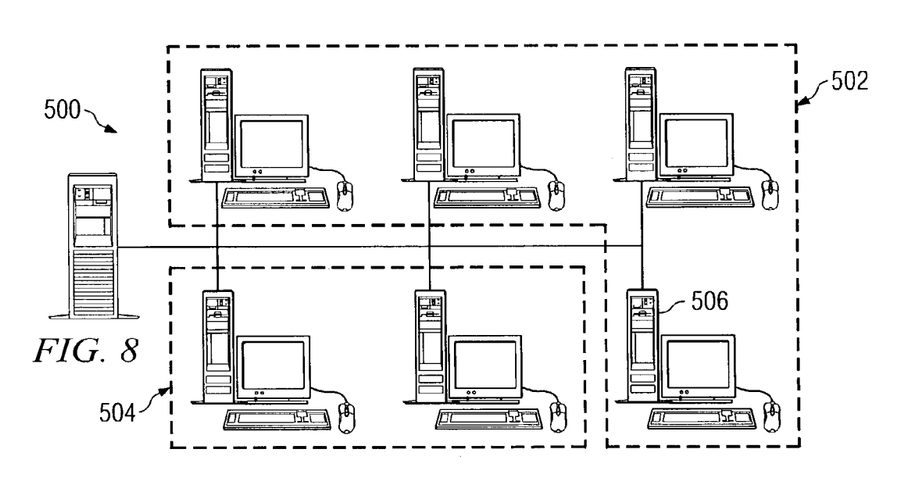
FIG. 8 is an illustration of a logically partitioned virtual system after application of the present invention.

Turning to FIG. 8, managed network 500 has been altered from the illustration in FIG. 7. In FIG. 8, computer 506 has been moved from second virtual network 504 to first virtual network 502 by PEP 200 of the present invention.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A computer implemented method for reallocating adapters in a logically partitioned managed system containing a plurality of adapters comprising:

selecting a performance parameter to measure the workload on each of the plurality of adapters;

collecting a plurality of performance parameter data for each of the plurality of adapters over a sampling interval;

identifying a plurality of adapter subclasses;

identifying a plurality of subclass collectives;

defining a donor load threshold and a recipient load threshold within each of the plurality of subclass collectives;

using the performance parameter to calculate a composite parameter, wherein the composite parameter is an average of the plurality of performance parameter data accumulated over the sampling interval;

analyzing each of the adapters within each of the subclass collectives to determine whether the composite parameter is greater than the donor load threshold;

analyzing each of the adapters within each of the subclass collectives to determine whether the composite parameter is less than the recipient load threshold;

identifying each adapter where the composite parameter is less than the recipient threshold as a recipient within its subclass collective;

identifying each adapter where the composite parameter is greater than the donor threshold as a donor within its subclass collective;

wherein a subclass collective is a collection of all adapters of a same subclass within the logically partitioned managed system; and responsive to identifying the donor and the recipient within its subclass collective, automatically moving a task or an application queued for the recipient to the donor.

2. The method of claim 1 further comprising:
selecting a capture interval; and
gathering a plurality of adapter data at each capture interval.

3. The method of claim 1 further comprising:
selecting a sampling interval; and
gathering a plurality of adapter data over the sampling interval.

4. The method of claim 1 further comprising:
entering a conditioning level; and
suspending reallocation of the adapter during the conditioning level.

5. The method of claim 1 further comprising:
determining if a sampling window is a moving window or a discrete window; and
wherein responsive to a determination that the sampling window is a moving window, discarding an oldest data sample and adding a newest data sample.

6. The method of claim 1 futher comprising:
determining if a sampling window is a moving window or a discrete window; and
wherein responsive to a determination that the sampling window is a discrete window, discarding all the data samples and collecting new data samples.

7. A computer implemented method for reallocating an adapter from a first virtual computer system to a second virtual computer system comprising:
specifying a donor load threshold for a first adapter;
specifying a recipient load threshold for a second adapter;
collecting a plurality of performance parameter data for the first and second adapters over a sampling interval:
calculating a composite parameter for a first adapter and for a second adapter, wherein the composite parameter is an average of the plurality of performance parameter data accumulated over the sampling interval;
determining if the composite parameter is less than the donor load threshold for the first adapter;
wherein responsive to the determination that the composite parameter is less than the donor load threshold for the first adapter, designating the first adapter as a donor;
determining if the composite parameter is greater than the recipient load threshold for the second adapter;
wherein responsive to the determination that the composite parameter is greater than the recipient load threshold for the second adapter, designating the second adapter as a recipient;
determining if reallocation is necessary based on the donor, the recipient and a first adapter subclass and a second adapter subclass;

wherein responsive to the determination that reallocation is necessary, automatically moving a task or an application queued for the recipient to the donor.

8. The method of claim 7 further comprising:
selecting a performance parameter; and
measuring the performance of a plurality of adapters based on the performance parameter.

9. The method of claim 7 further comprising:
selecting a capture interval; and
gathering an adapter data at each capture interval for each of a plurality of adapters.

10. The method of claim 7 further comprising:
selecting a sampling interval; and
gathering an adapter data over the sampling interval for each of a plurality of adapters.

11. The method of claim 7 further comprising:
designating a donor candidate;
designating a recipient candidate;
wherein the donor candidate is eligible to donate to the recipient candidate; and
wherein the recipient candidate is eligible to receive from the donor candidate.

12. The method of claim 7 further comprising:
entering a conditioning level; and
suspending the reallocation of the adapter during the conditioning level.

13. The method of claim 7 further comprising:
determining whether reallocation should continue; and
wherein responsive to said determination, running a reallocation program.

14. The method of claim 7 further comprising:
determining if a sampling window is a moving window or a discrete window; and
wherein responsive to a determination that the sampling window is a moving window, discarding an oldest data sample and adding a newest data sample.

15. The method of claim 7 further comprising:
determining if a sampling window is a moving window or a discrete window; and
wherein responsive to a determination that the sampling window is a discrete window, discarding all the data samples and collecting new data samples.

16. A program product encoded on a computer readable storage medium with instructions to cause a computer to reallocate adapters within a logically partitioned managed system, the program product comprising:
first instructions for calculating a composite parameter for an adapter;
second instructions for collecting a plurality of performance parameter data for the adapter over a sampling interval;
third instructions for using the plurality of performance parameter data to calculate the composite parameter for the adapter, wherein the composite parameter is an average of the plurality of performance parameter data accumulated over the sampling interval;
fourth instructions for determining if the composite parameter is greater than a recipient load threshold;
wherein responsive to the determination that the composite parameter is greater than the recipient load threshold, fifth instructions for designating the adapter as a recipient;
sixth instructions for determining if the composite parameter is less than a donor load threshold;

wherein responsive to the determination that the composite parameter is less than the donor load threshold, seventh instructions for designating the adapter as a donor; and eighth instructions for determining if reallocation is necessary based on the donor, the recipient and the adapter subclass, and for automatically moving a task or an application queued for the recipient to the donor in responsive to a determination that reallocation is necessary.

17. The program product of claim 16 further comprising:
ninth instructions for determining if a sampling window is a moving window or a discrete window; and
wherein responsive to a determination that the sampling window is a moving window, tenth instructions for discarding an oldest data sample and adding a newest data sample.

18. The program product of claim 16 further comprising:
eleventh instructions for determining if a sampling window is a moving window or a discrete window; and
wherein responsive to a determination that the sampling window is a discrete window, twelveth instructions for discarding all the data samples and collecting new data samples.

19. A program product encoded on a computer readable storage medium containing a plurality of instructions for causing a computer to reallocate an adapter from a first virtual computer system to a second virtual computer system, the program product comprising:
a first plurality of instructions for causing the computer to:
specify a donor load threshold for a first adapter;
specify a recipient load threshold for a second adapter;
collect a plurality of performance parameter data for the first and second adapters over a sampling interval;
calculate a composite parameter for a first adapter and for a second adapter, wherein the composite parameter is an average of the plurality of performance parameter data accumulated over the sampling interval;
determine if the composite parameter is less than the donor load threshold for the first adapter;
wherein responsive to the determination that the composite parameter is less than the donor load threshold for the first adapter, designate the first adapter as a donor;
determine if the composite parameter is greater than the recipient load threshold for the second adapter;
wherein responsive to the determination that the composite parameter is greater than the recipient load threshold for the second adapter, designate the second adapter as a recipient; and
determine if reallocation is necessary based on the donor, the recipient and a first adapter subclass and a second adapter subclass;

wherein responsive to the determination that reallocation is necessary, reallocate the donor to the recipient so that a task or an application queued for the recipient is automatically moved to the donor.

20. The program product of claim 19 further comprising:
a second plurality instructions for causing the computer to:
select a performance parameter; and
measure the performance of the adapter based on the performance parameter.

21. The program product of claim 19 further comprising:
a third plurality of instructions for causing the computer to:
select a capture interval; and
gather an adapter data at each capture interval.

22. The program product of claim 19 further comprising:
a fourth plurality of instructions for causing the computer to:
select a sampling interval; and
gather an adapter data over the sampling interval.

23. The program product of claim 19 further comprising:
a fifth plurality of instructions for causing the computer to:
designate a donor candidate;
designate a recipient candidate;
wherein the donor candidate is eligible to donate the adapter to the recipient candidate; and
wherein the recipient candidate is eligible to receive the adapter from the donor candidate.

24. The program product of claim 19 further comprising:
sixth plurality of instructions for causing the computer to:
enter a conditioning level; and
suspend the reallocation of the adapter during the conditioning level.

25. The program product of claim 19 further comprising:
a seventh plurality of instructions for causing the computer to:
determine if a sampling window is a moving window or discrete window; and
wherein responsive to a determination that the sampling window is a moving window, discard an oldest data sample and add a newest data sample.

26. The program product of claim 19 further comprising:
an eighth plurality of instructions for causing the computer to:
determine if a sampling window is a moving window or a discrete window; and
wherein responsive to a determination that the sampling window is a discrete window, discard all the data samples and collect new data samples.

* * * * *